United States Patent [19]
Kageyama

[11] Patent Number: 5,140,649
[45] Date of Patent: Aug. 18, 1992

[54] GRADATION CORRECTING APPARATUS FOR CORRECTING LUMINANCE SIGNAL IN ACCORDANCE WITH DETECTED COLOR SIGNAL

[75] Inventor: Atsuhisa Kageyama, Ibaraki, Japan

[73] Assignee: Matsushita Electric Industrial Co., Ltd., Osaka, Japan

[21] Appl. No.: 651,619

[22] Filed: Feb. 6, 1991

[30] Foreign Application Priority Data

Feb. 16, 1990 [JP] Japan ................................ 2-36549

[51] Int. Cl.⁵ ............................................. G06K 9/38
[52] U.S. Cl. ........................................ 382/51; 382/18
[58] Field of Search ............................ 382/18, 50, 51; 358/448, 453, 458, 462, 464, 465, 466

[56] References Cited

U.S. PATENT DOCUMENTS

| | | | |
|---|---|---|---|
| 4,656,665 | 4/1987 | Pennebaker | 382/18 |
| 4,741,046 | 4/1988 | Matsunawa et al. | 382/18 |
| 4,903,142 | 2/1990 | Hasebe et al. | 358/458 |
| 4,931,864 | 6/1990 | Kawamura et al. | 358/458 |
| 5,003,614 | 3/1991 | Tanaka et al. | 382/51 |

*Primary Examiner*—Jose Couso
*Attorney, Agent, or Firm*—Wenderoth, Lind & Ponack

[57] ABSTRACT

A gradation correcting apparatus for correcting the gradation of a picture signal using histogram memories in the television image receiving machine, video tape recorder and so on. When color picture signals have been inputted, the picture portion having the particular color component is detected so as to digitally effect the gradation correcting operation in accordance with the color component.

4 Claims, 4 Drawing Sheets histogram data cumulative normalized histogram luminance converting curve

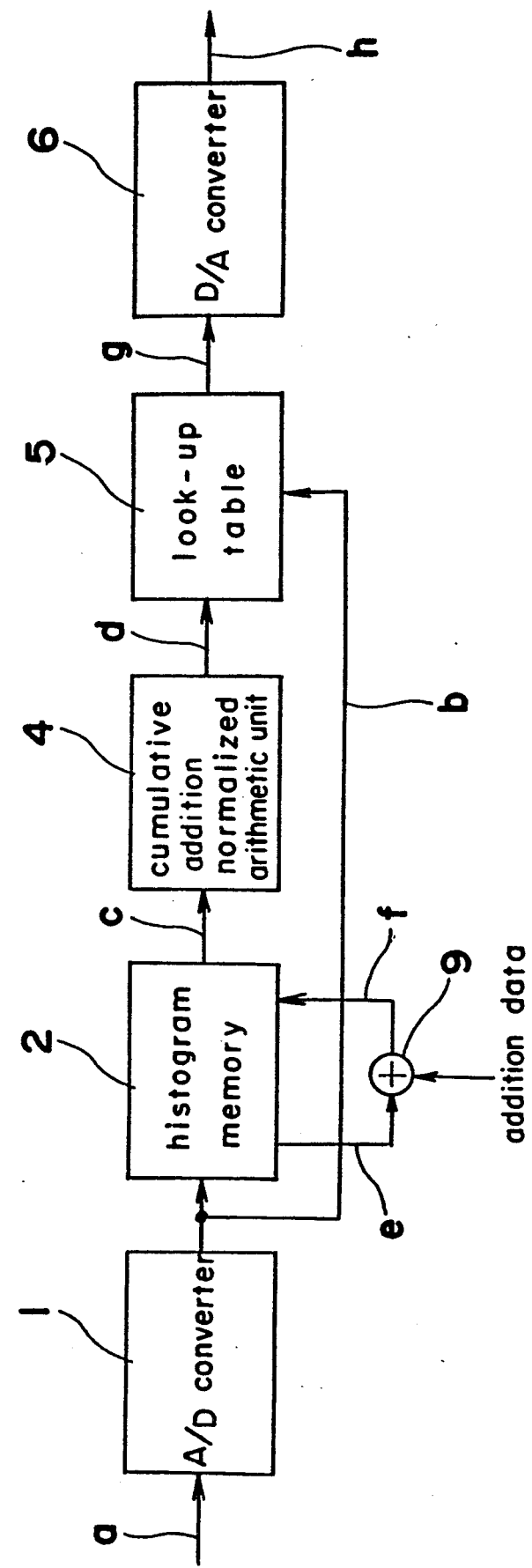

histogram data of an input luminance signal cumulative normalized histogram luminance converting curve

GRADATION CORRECTING APPARATUS FOR CORRECTING LUMINANCE SIGNAL IN ACCORDANCE WITH DETECTED COLOR SIGNAL

BACKGROUND OF THE INVENTION

The present invention generally relates to a gradation correcting apparatus which is capable of correcting the gradation of picture signals in picture apparatuses such as television image receiving machines, video tape recorders and so on.

In recent years, the gradation correcting apparatus is regarded as important in terms of the more dynamic expression of the picture signals on a cathode-ray tube (CRT) as the television image receiving machines become larger in size, and higher in picture quality.

The conventional gradation correcting apparatus will be described hereinafter in one example with reference to the drawings.

FIG. 3 is a block diagram of the conventional gradation correcting apparatus. In FIG. 3, reference numeral 1 is an analog to digital (A/D) converter for converting an input luminance signal a, which is an analog signal, into a digital data so as to output a luminance signal data b. Reference numeral 2 is a histogram memory. The histogram memory is a memory where a memory address is set corresponding to the luminance signal data b, the data of the address data shows a histogram corresponding to the respective input luminance the data of the luminance is read as a histogram memory output data e in accordance with the input luminance. In the histogram memory 2, after a particular summing data has been calculated into a histogram memory output data e by an externally provided adder 9, it is stored in an address corresponding to the luminance of the input luminance signal (histogram memory input data f). Here the particular summing data means, for example, "1". Reference numeral 4 is a cumulative addition normalized arithmetic unit, which cumulatively adds as the input the histogram data c from the histogram memory 2, normalizes so that the maximum value after the cumulative addition thereof may become a maximum value of the output luminance so as to output the cumulative normalized histogram data d. Reference numeral 5 is a look up table which has memories therein. The look up table 5 has addresses established in accordance with the luminance of the luminance data b, stores the cumulative · normalized histogram data d in the address, reads the data of the address corresponding to the luminance data so as to be synchronized with the input of the luminance data b, and outputs it as an output luminance signal data g. Reference numeral 6 is a digital to analog (D/A) converter, which converts the output luminance signal data g into the output luminance signal h of the analog so as to output it.

The gradation correcting apparatus constructed as described hereinabove will be described hereinafter in its operation with reference to FIG. 3 and FIG. 4.

The input luminance signal a is converted into the luminance signal data b by the AD converter 1. The data of the address of the histogram memory corresponding to the luminance signal data b (luminance thereof) is selected and becomes the histogram memory output data e. The data e has the addition data (1) added by the adder 9, becomes a histogram memory input data f, is stored again in the previous address of the histogram memory 2. The histogram is provided about one sheet of or several sheets of pictures in this manner. The histogram obtained in this manner is shown in, for example, FIG. 4 (a) After the histogram has been provided, the data (histogram data c) from the histogram memory 2 is read into the cumulative addition · normalized arithmetic unit 4 in order from the smaller address (smaller input luminance) The cumulative histogram is calculated in the arithmetic unit 4, and the maximum value of the cumulative value is normalized so that it becomes the maximum value of the input luminance signal data. This is shown in FIG. 4 (b) The data whose normalization has been finished is inputted into the look up table 5 as the cumulative · normalized histogram data d. The look up table 5 is composed of random · access · memory (RAM), where the address is used to become the input luminance, the data of the address is used to become the cumulative normalized histogram data d. When the setting of the data d is finished in the look up table 5, the gradation correction is effected. In the gradation correction, the input luminance signal data b is inputted into the look up Table 5, an address is set in accordance with the data b to read the data of the address. This becomes an output luminance signal data g (FIG. 4 (c)). The data g is inputted into the D/A converter 6, and is converted into an analog amount. The output luminance signal h is obtained, which allows the gradation correction to be effected. The above described processing is generally called histogram conversion processing in the field of the picture processing.

In such a conventional gradation correcting apparatus, no problems are caused in the processing of black and white signals. When the processing has been applied to the color picture signals, problems are provided in that the portion where the gradation wants to be actually enlarged, the portion near the I shaft of NTSC system regarded as colors sensitive to, for example, the human faces, eyes are not sufficiently enlarged in gradation, and so on, because the color information is not inputted.

SUMMARY OF THE INVENTION

Accordingly, an essential object of the present invention has been developed with a view to substantially eliminating the above discussed drawbacks inherent in the prior art, and has for its essential object to provide an improved gradation correcting apparatus.

Another important object of the present invention is to provide an improved gradation correcting apparatus, which detects the portion of the picture having the particular color and luminance or either of both, the histogram addition data in the provision of the histogram is corrected so that the gradation of the portion may become enlarged, with the result that what wants actually to be enlarged in the gradation may be corrected sufficiently in gradation.

In accomplishing these and other objects, according to one preferred embodiment of the present invention, which is provided with an addition summing data controller and a correction color detecting circuit, in addition to the conventional construction, and is capable of controlling the summing data for correcting the histogram in accordance with the color component as well as the conventional luminance.

When a portion having a particular color is detected by the correction color detecting circuit from the color signal data and the luminance signal data by the above described construction so as to add the summing data of the histogram memory by the result, the present invention has the width of the selection thereof in accordance with the detected correction color as the correction data, instead of the conventional particular correction data. As a result, the histogram summing data of the luminance portion becomes larger. When the cumulative · normalized operation is effected, the variation amount in the luminance portion becomes larger, and the gradation is enlarged.

BRIEF DESCRIPTION OF THE DRAWINGS

These and other objects and features of the present invention will become apparent from the following description taken in conjunction with the preferred embodiment thereof with reference to the accompanying drawings, in which;

FIG. 3 is a block diagram of the conventional gradation correcting apparatus.

DETAILED DESCRIPTION OF THE INVENTION

Figure 1:
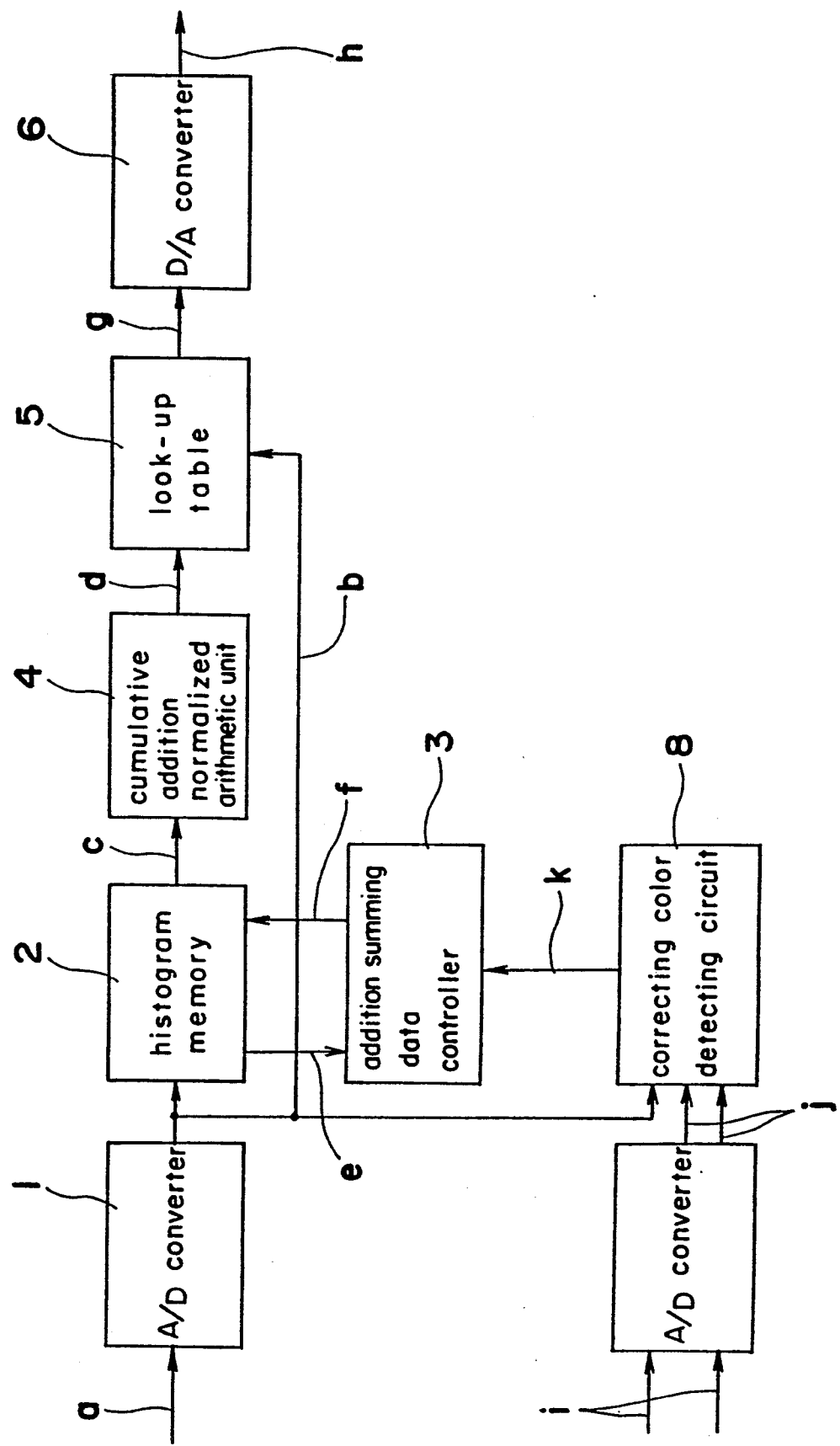
FIG 1 i a block diagram of a gradation correcting apparatus in accordance with one embodiment of the present invention.

Before the description of the present invention proceeds, it is to be noted that like parts are designated by like reference numerals throughout the accompanying drawings.

Referring now to the drawings, there is shown in FIG. 1, a block diagram of a gradation correcting apparatus according to one preferred embodiment of the present invention, which includes an A/D converter 1, a histogram memory 2, a cumulative addition · normalized arithmetic unit 4, a look up table 5, a D/A converter 6, which are similar to those in the conventional embodiment. Reference numeral 3 is an addition summing data controller, which is adapted to add the addition data corresponding to the correction color detecting data k into the histogram memory output data e so as to output the histogram memory input data f. Reference numeral 7 is an A/D converter, which is adapted to effect the A/D conversion of an input color signal i (color carrier wave signal, color difference signals R-Y, B-Y, G-Y or I, Q signals) so as to output an input color signal data j. Reference numeral 8 is a correction color detecting circuit, where the input luminance signal data b, the input color signal data j are provided as inputs and , a color portion for strengthening the gradation correction which is an object is detected from the size of these signals so as to output the detection result as the correction color detection data k.

The gradation correcting apparatus constructed as described hereinabove will be described hereinafter in its operation with reference to FIG. 1 and FIG. 2(a)–2(c).

Figure 2A:
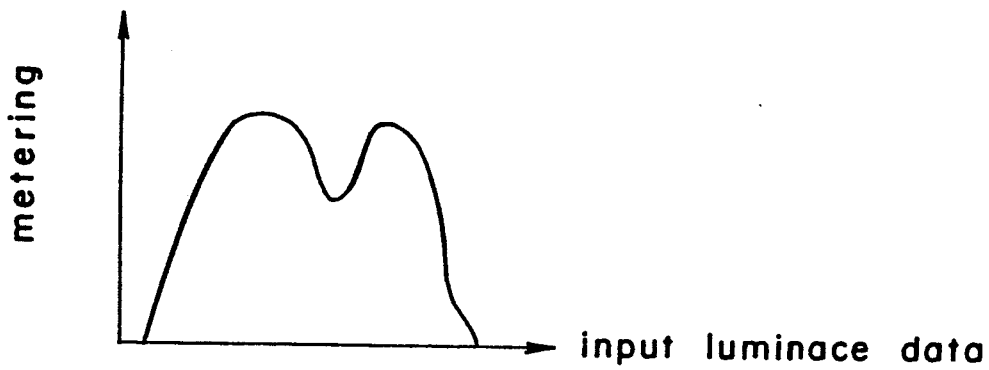
FIGS. 2(a)–2(c) show characteristic graphs for illustrating the operation of FIG. 1.
Figure 2B:
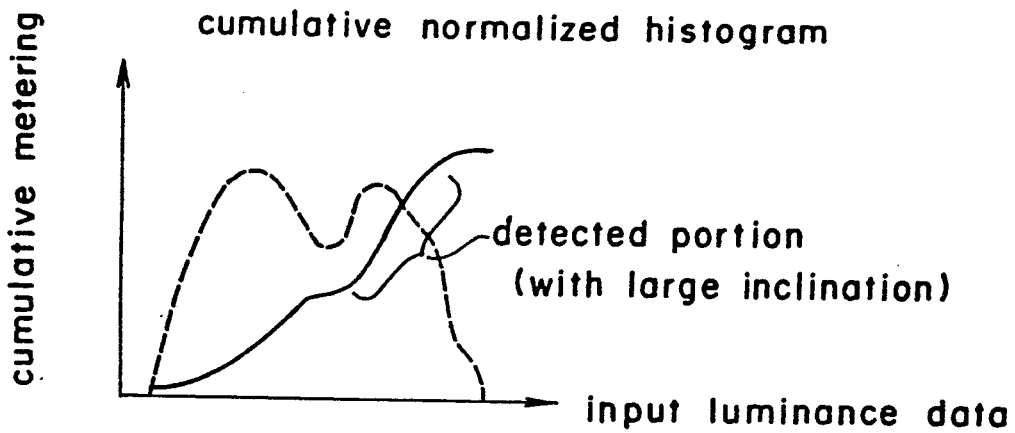
Figure 2C:
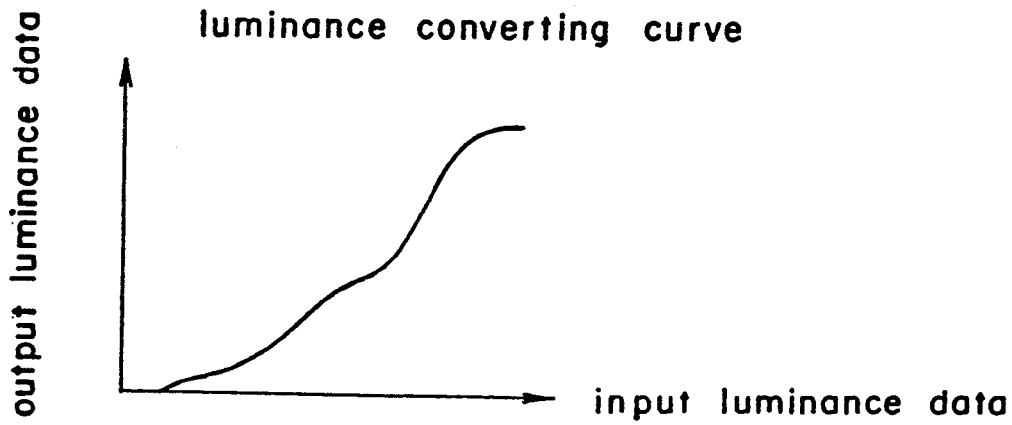
Figure 4A:
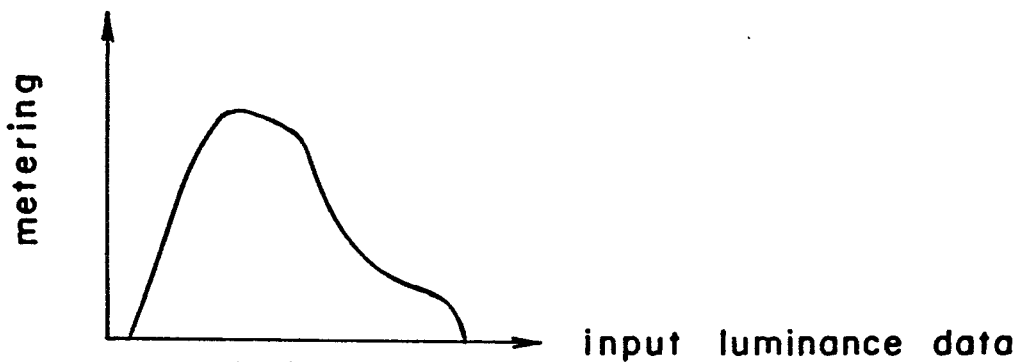
FIG. 4(a)–4(c) show characteristic graphs for illustrating the operation of FIG. 3.
Figure 4B:
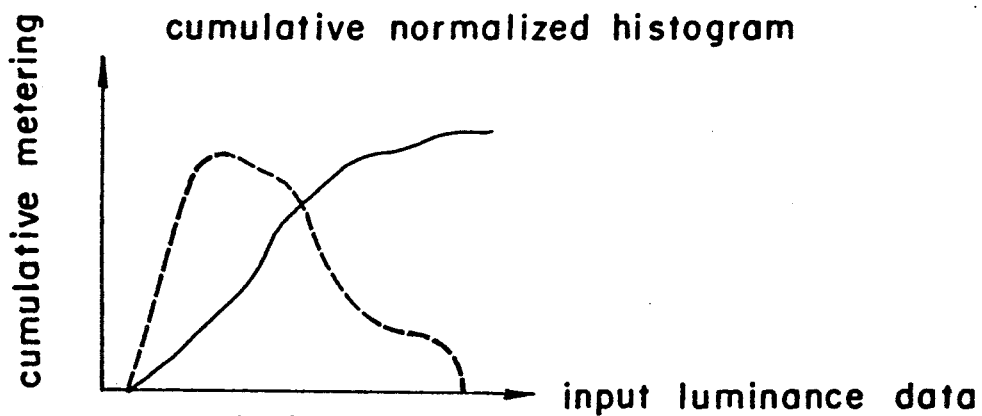
Figure 4C:
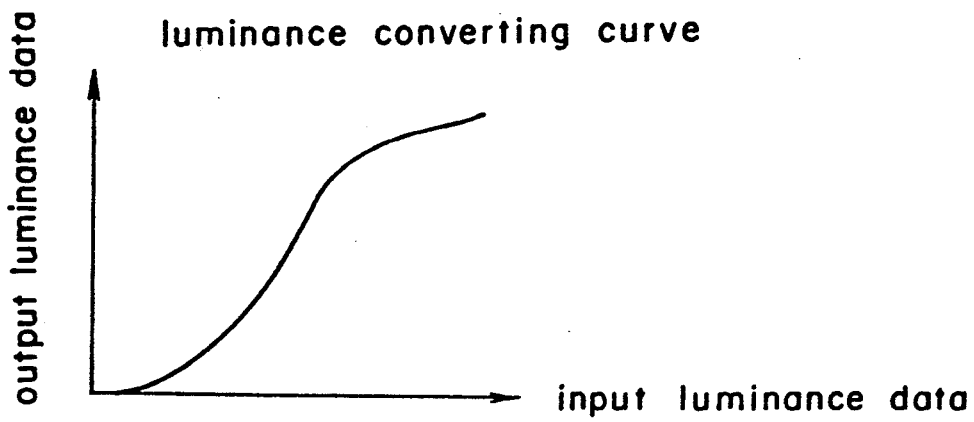

FIG. 2(a)–2(c) show the current of the histogram conversion in the present embodiment in the order of 2(a)–(2b)–(c). The difference between the conventional embodiment and the present embodiment is in that the addition summing data controller 3, instead of the adder 9 in the conventional embodiment, is provided in the present embodiment, and the addition summing data is varied with the input color signal i and the input luminance signal a. The input color signal i is inputted into the color signal A/D converter 7, and is converted into the input color signal data j. The input color signal data j and the input luminance signal data b are inputted into the correcting color detecting circuit 8 so as to detect a portion having the particular color and luminance or either of them. In order to detect, for example, the portion of the flesh tint, the computation of $$A \cdot (R-Y) - B \cdot (B-Y) \tag{1}$$

where the input color signal i shows the color difference signals R−Y and B−Y. (A and B are assumed to be positive constants). When the result in the equation is large, it is judged to be close to the flesh tint. As the flesh tint is comparatively high in luminance, a judgment result that the luminance is bright is added to the judgment result. Namely, a portion where the size of the input luminance signal data b inputted into the correction color detecting circuit 8 is large is detected through the construction of a comparing circuit and so on, so that the detecting result becomes correct. In this manner, in the portion having the particular color, luminance, the detection of the portion is effected so as to output the correcting color signal data k. This signal k is inputted into the addition summing data controller 3. The addition summing data controller 3 decides the summing data for adding into the histogram memory output data e in accordance with the correcting color signal data k. Although, in the conventional embodiment, a value 1 has been added, in the present embodiment, the addition summing data is controlled so that it may become larger when the particular portion has been detected. Therefore, the addition summing data of the histogram memory becomes larger in the portion detected by the correction color detecting circuit 8. As a result, the cumulative · normalized histogram data d obtained through the cumulation and normalization of the histogram obtained as described hereinabove becomes larger in its inclination (variation amount) in the portion detected by the correcting color detecting circuit 8 as described in FIG. 2 (b). As a result, the luminance in that portion is to be enlarged as shown in FIG. 2 (c).

According to the present embodiment as described hereinabove, a color signal A/D converter 7 for AD converting the color signal is provided. A portion having a particular color is detected by the correction color detecting circuit 8 from the color signal data j to be obtained by it and the input luminance signal data existing b from the conventional embodiment. When the summing data of the histogram memory 2 is added by the results, the histogram summing data of the luminance portion becomes larger by the provision of the addition summing data controller 3 for having the larger value, instead of the conventional 1, as the addition data. As a result, the variation amount of the luminance portion becomes larger when the cumulative · normalizing operation is effected, so that the gradation may be enlarged.

Although the color difference signal is used in the (1) equation in the present embodiment or it may be I, Q signals, or a color carrier wave signal. Also, it may be a plurality of signals or either of them. Also, although the addition summing data controller 3, the cumulative adder 4, the normalizing arithmetic unit 4, the correction color detecting circuit 8 are respectively shown additionally, a general purpose arithmetic apparatus such as microprocessor or the like may be used for them and one portion thereof. Also, although the histogram memory 2 and the look up table 5 are shown separately, they may use one memory in common.

As is clear from the foregoing description, according to the arrangement of the present invention, by the addition summing data controller, the color signal A/D converter, the correction color detecting circuit are provided in addition to the construction of the gradation correcting apparatus using the conventional histogram memory, the portion of the picture having the particular color and luminance or either of them is detected, the histogram addition data in having the histogram is corrected so that the gradation of the portion may be enlarged, so that what wants to be really enlarged can be sufficiently corrected in gradation.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A gradation correcting apparatus comprising a histogram memory for obtaining the histogram of an input luminance signal, said histogram shows how the pixels per screen are distributed in accordance with input luminance signal and one ordinary is added to histogram data as a summing data, an arithmetic unit for having the histogram data, outputted rom the histogram memory, as inputs so as to obtain the cumulative histogram, normalizing the maximum level of cumulative histogram so that it can be the same as that of an output signal, with look-up table memory which can store the normalized cumulative histogram data by corresponding address of the memory with the input luminance signal, the table memory will be referred by the corresponding input luminance signal and the data which is read from the memory is output data, an output circuit for having the output of the arithmetic unit as the input so as to synchronize the input luminance signal with the normalized arithmetic unit output, outputting the arithmetic unit output as the luminance signal data, in addition to taking into consideration the color signal corresponding to the luminance signal, a correction color detecting circuit for inputting at least one of the color signal and the luminance signal as the input, detecting the picture component having at least either of the particular color and luminance, a controlling circuit for correcting the summing data, to get more than "one" level, which is added to the histogram data to be retained in the histogram memory in accordance with the detection data to make the summing data of a particular color larger.

2. A gradation correcting apparatus described in accordance with claim 1, where the portion, larger in size, of the input luminance signal data to be inputted into the correction color detecting circuit is adapted to be detected by a comparing circuit.

3. A gradation correcting apparatus described in accordance with the claim 1, further comprising a means for detecting by a comparing circuit the portion, larger in size, of the input luminance signal data to be inputted into the correction color detecting circuit so as to output the correction color signal data, an addition summing data controller for inputting the signal of the output means so as to determine the summing data to be added to the histogram memory output data in accordance with the correcting color signal data.

4. The graduation correcting apparatus described in accordance with the claim 3, where the correction color detecting circuit and the addition summing data controller are adapted to respectively process the signal data with digital data.

* * * * *